United States Patent Office 3,461,206
Patented Aug. 12, 1969

3,461,206
COMPOSITIONS CONTAINING A SULFANILAMIDE AND A 2,4-DIAMINO-5-[2',4',5'-TRISUBSTITUTED-BENZYL]PYRIMIDINE
Max Hoffer and Milan Mitrovic, Nutley, N.J., assignors to Hoffmann-La Roche Inc., Nutley, N.J., a corporation of New Jersey
No Drawing. Continuation-in-part of application Ser. No. 410,793, Nov. 12, 1964. This application June 2, 1965, Ser. No. 460,834
Int. Cl. A61k 27/00
U.S. Cl. 424—229     20 Claims

ABSTRACT OF THE DISCLOSURE

Compositions comprising a 2,4-diamino-5-(2',4',5'-trisubstitutedbenzyl)pyrimidines and a sulfanilamide such as sulfadimethoxine, sulfaquinoxaline or sulfamethoxazole are described. The aforementioned compositions are useful as anticoccidial and antibacterial agents.

CROSS REFERENCE TO RELATED APPLICATIONS

This application is a continuation-in-part of U.S. Patent application Serial No. 410,793, filed Nov. 12, 1964, now abandoned.

This invention relates to compositions comprising of a 2,4 - diamino - 5 - (2',4',5' - trisubstitutedbenzyl)pyrimidine and a sulfanilamide, and to the administration of these compositions to poultry.

The instant compositions comprise a sulfanilamide, preferably either sulfadimethoxine [N¹-(2,6-dimethoxy-4-pyrimidinyl)sulfanilamide], sulfaquinoxaline [N¹-(2-quinoxalinyl)sulfanilamide], or sulfamethoxazole [3-sulfanilamido-5-methylisoxazole], in combination with a 2,4-diamino - 5 - (2',4',5' - trisubstitutedbenzyl)pyrimidine of the formula

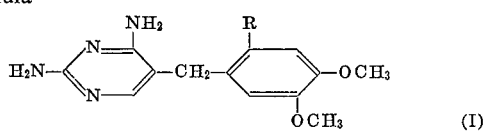

wherein R is methoxy, methyl, or ethyl.

From about 0.01 to about 20 parts, preferably from about 0.1 to about 2.5 parts by weight of a 2,4-diamino-5-(2',4',5'-trisubstitutedbenzyl)pyrimidine of Formula I is employed per part by weight of the sulfanilamide. These compositions are useful in the prevention and treatment of coccidiosis in poultry, e.g., in chickens, the cecal type caused by Eimeria tenella and the intestinal type caused by at least eight types of Eimeria, e.g., E. acervulina, E. brunetti, E. hagani, E. maxima, E. mivati, E. mitis, E. necatrix and E. praecox. Coccidiosis in turkeys, caused, e.g., by E. meleagrimitis, E. gallopavonis, E. adenoeides, etc., is also effectively prevented or cured by the instant compositions. The activity of the instant compositions against coccidiosis is much greater than a simple additive effect of the two components employed independently; i.e., a 2,4-diamino-5-(2',4',5'-trisubstitutedbenzyl)pyrimidine of formula I very strongly potentiates the anticoccidiosos activity of sulfadimethoxine, sulfaquinoxaline, and sulfamethoxazole. The instant compositions are also effective against strains of Eimeria which are resistant to the above sulfanilamides employed alone or in combinations with each ohter (i.e., a combination of two or even all three of the above sulfanilamides).

The fact that the instant compositions are highly active against coccidiosis is quite surprising since other closely related pyrimidines do not potentiate the anticoccidiosis activity of the above sulfanilamides. For example, 2,4-diamino-5-(2',3',4' - trimethoxybenzyl)pyrimidine, 2,4-diamino-5-(2',3',4',6' - tetramethoxybenzyl)pyrimidine, 2,4-diamino - 5-(2',4',5', - trichlorobenzyl)pyrimidine, 2,4-diamino-5-(2',4',5'-trimethylbenzyl)pyrimidine, etc., do not potentiate the activity of the above sulfanilamides against E. tenella at comparable doses. Furthermore, the instant compositions are active against a wide range of pathogenic poultry bacterial infections, e.g., against S. aureus, P. multocida, H. gallinarum, E. coli, etc. This is an outstanding advantage of the instant compositions since frequently poultry suffer from bacterial infections simultaneously with coccidiosis infections, and the compositions of the invention are useful in the treatment or prevention of both. This concomitant antibacterial activity is a property not possessed by the more effective coccidiostats currently on the market, e.g., Amprol, Amprol Plus, Zoalene, nicarbazin, etc.

The instant compositions are administered to poultry by incorporating the compositions in poultry comestibles, e.g., feedstuffs or foodstuffs, either solid or liquid. Normally, concentrations in solid feedstuffs or foodstuffs range from about 0.005 to about 0.05 percent, preferably from about 0.01 to about 0.05 percent of a sulfanilamide, and from about 0.001 to about 0.050 percent, preferably from about 0.005 to about 0.025 percent of a 2,4-diamino-5-(2',4',5'-trisubstitutedbenzyl)pyrimidine of Formula I, based on the weight of comestible, are employed for prophylactic purposes, i.e., to prevent or suppress the occurrence of coccidiosis in coccidiosis-free birds. For the treatment of poultry having coccidiosis, from about 0.005 to about 0.1, preferably from about 0.01 to about 0.05 percent of a sulfanilamide, and from about 0.001 to about 0.1, preferably from about 0.005 to about 0.025 percent of a 2,4-diamino-5-(2',4',5'-trisubstitutedbenzyl)-pyrimidine of Formula I is normally employed. Instead of employing the above compositions in feedstuffs, they can be employed in the same concentrations in drinking water or other ingestible liquid. In either case the poultry is allowed to feed or drink ad libitum.

If desired, the instant combinations can be used in the form of a premix, i.e., intermixed with a diluent material nontoxic to poultry which can be a feedstuff ration or mixture, e.g., a poultry mash; a grain product, e.g., corn meal, hominy feed, corn distillers' dried grains, soybean meal, soya grits, wheat middlings, farina, rice grits, rice bran, crimped oats, oatmeal, brewers' grains, malt sprouts, etc.; a pulverulent mineral, e.g., limestone, oyster shell meal, salt, clay, talc, etc. an animal by-product e.g., fish meal, dried fish solubles, meat scraps, tankage, bone meal, dried whey, dried milk solids, etc.; and miscellaneous carriers such as antibiotic mycelia, fermentation solubles, distillers' solubles, molasses solubles, dried yeast, dried citrus meal, etc. The concentration of the instant components in the premix can range from about 1.25 to about 25 percent of a sulfanilamide and about 0.25 to about 25 percent of a 2,4-diamino-5-(2',4',5'-trisubstitutedbenzyl)-pyrimidine of Formula I. Also a liquid concentrate or dispersion having the above concentration can be employed wherein the diluent material is water or other ingestible liquid. The premix can then be added by the poultry grower or by a poultry feed manufacturer to poultry feed (or to water if a liquid concentrate) to give a desired final concentration of the instant compositions for treating the poultry.

It is to be understood that the 2,4-diamino-5-(2',4',5'-trisubstitutedbenzyl)pyrimidines of Formula I can be employed in the instant compositions either as such or in the form of an acid addition salt with a pharmaceutically acceptable acid.

The use of the term "poultry comestible" in the specification is to be understood to mean any solid or liquid composition which is orally ingestible by poultry, including, e.g., grain, mash, scratch, pulverulent comestibles, water, or other comestible liquids, the diluent materials nontoxic to poultry given above as premix ingredients, etc.

Example 1

A poultry mash was mixed with 0.01 part by weight of 2,4-diamino-5-(2',4',5'-trimethoxybenzyl)pyrimidine and 0.02 part by weight of sulfadimethoxine. The mash was fed to 50 uninfected chickens ad libitum. After the third day of feeding, the chickens were inoculated with *E. tenella, E. acervulina,* and *E. necatrix* by orally administering a suspension of the three organisms. None of the chickens showed symptoms of coccidiosis and no mortality resulted. An untreated but inoculated control group of 50 chickens showed 40 to 70 percent mortality.

Example 2

Four-week old chickens were inoculated with *E. tenella* and divided into two groups. Groups of 10 chickens administered 0.005 percent 2,4-diamino-5-(2',4',5'-trimethoxybenzyl)pyrimidine and 0.025 percent sulfaquinoxaline in the drinking water for a 6 day period, starting 48 to 96 hours after inoculation. No mortality resulted. Inoculated groups receiving plain water showed 20 to 50 percent mortality.

Example 3

A turkey mash was mixed with 0.0125 part by weight of 2,4-diamino-5-(2',4',5'-trimethoxybenzyl)pyrimidine and 0.025 part by weight of sulfamethoxazole and fed ad libitum to turkeys. Groups of 10 turkeys each fed the treated feed for 3 or more days and then inoculated with *E. gallopavonis* showed no mortality. Inoculated groups receiving plain feed showed 10 to 25 percent mortality.

Example 4

A poultry mash was mixed with 0.01 part by weight of 2,4-diamino-5-(4',5'-dimethoxy-2'-methylbenzyl)pyrimidine and 0.01 part by weight of sulfadimethoxine. The mash was fed to 3 groups of 10 chickens each ad libitum. After the third day of feeding, the chickens were inoculated with *E. tenella,* sulfaquinoxaline resistant strain, by orally administering a suspension of the organism. None of the chickens fed potentiated mixture died, while mortality among the untreated but inoculated control group was 40 percent. Chickens treated with 0.020 part by weight of sulfadimethoxine exhibited 70 percent mortality.

Example 5

A poultry mash was mixed with 0.0075 part by weight of 2,4-diamino-5-(2'-ethyl-4',5'-dimethoxybenzyl)pyrimidine and 0.0175 part by weight of sulfadimethoxine. The mash was fed to 20 uninfected chickens ad libitum. After the third day of feeding the chickens were inoculated with *E. maxima* and *E. brunetti* by administering a suspension of the two organisms. None of the chickens showed symptoms of coccidiosis and no mortality resulted. An untreated but inoculated control group of 20 chickens showed 20 percent mortality.

Since the 2,4-diamino-5-(2',4',5'-trisubstitutedbenzyl) pyrimidines of Formula I are novel compounds, processes for their preparation are given for purposes of completeness. However, it is to be understood that neither these processes nor the 2,4-diamino-5-(2',4',5'-trisubstitutedbenzyl)pyrimidines of Formula I per se comprise a part of the invention disclosed and claimed herein.

Preparation of 2,4-diamino-5-(2',4',5'-trimethoxybenzyl)pyrimidine.—Acetylthymine (34 g.=0.2 mole), chloroform (alcohol-free) (250 ml.), N-bromosuccinimide (39 g.=0.22 mole) and benzyl peroxide (2 g.) were refluxed under stirring for 1 hour, resulting in a clear pale orange solution. The solution was transferred to a 1 liter beaker and chilled until crystallization began. Heptane (350 ml.) was gradually added as the crystallization proceeded. The crystals, a mixture of the product and succinimide, were filtered by suction. Separation from the latter and traces of bromosuccinimide were effected by stirring the filter cake with a solution of 10 g. of sodium bisulfite in 400 ml. of ice cold water for 5 to 10 minutes and filtering by suction. It was washed twice on the filter, each time with 200 ml. of ice cold water, then with a little ether, and pressed as dry as possible. It was dried in a vacuum over $P_2O_5$ for 24 hours. The product, 1-acetyl-2,4-diketo-5-bromomethyl-1,2,3,4-tetrahydropyrimidine (acetylbromothymine) when recrystallized from dry benzene, melted at 168°.

To a solution of acetylbromothymine (9.88 g.=0.04 mole) and 1,3,4-trimethoxybenzene (8 g.=0.0475 mole) in nitrobenzene (20 ml.) warmed to 85–90°, there was added mercuric chloride (5.6 g.=0.02 mole). An exothermic reaction started immediately under evolution of hydrogen bromide, the temperature rose to 110° and an intense green color of a mercuric chloride complex developed. After keeping the temperature at 110° for 10 minutes, the mixture was allowed to cool. The mixture was stirred with a solution of 10 g. of sodium iodide in 25 ml. of 3 N aqueous sodium hydroxide solution in order to decompose the mercuric chloride complex of the product, extracted with ether to remove nitrobenzene and the aqueous layer neutralized with acetic acid. The product deposited crystalline and was collected by filtration through a suction funnel. To purify it, the product was suspended in 25 ml. of hot water, sodium hydroxide solution (10 ml.) was added in order to dissolve the material, the solution charcoaled, and the filtrate acidified with acetic acid, under chilling. There is obtained 5-(2',4',5'-trimethoxybenzyl)uracil as a white crystalline powder of melting point 238–239°.

21 g. (0.072 mole) of 5-(2',4',5'-trimethoxybenzyl) uracil was refluxed with phosphorus oxychloride (140 ml.) and dimethylaniline (5 ml.) for 3 hours, under stirring. The excess phosphorus oxychloride was distilled off in a vacuum from a water bath and the residue slurried with ice water. The undissolved material was extracted with ether, the ether layer washed with 1 N sodium hydroxide solution and then water. 2,4-dichloro-5-(2',4',5'-trimethoxybenzyl)pyrimidine of melting point 95–96° was obtained as white crystals after evaporation of the ether.

2,4-dichloro-5-(2',4',5'-trimethoxybenzyl)pyrimidine (18.2 g.=0.055 mole) was autoclaved with methanolic ammonia (300 ml. saturated at 10°) at 150–160° for 6 hours. Upon allowing the solution to cool, part of the product crystallized and was collected by filtration. The filtrate was evaporated on a steam bath and the crystalline residue slurried with 50 ml. of 3 N aqueous sodium hydroxide solution. The undissolved crystals were collected by filtration. To purify the material, the combined products were dissolved in 100 ml. of hot 10 percent acetic acid, the solution charcoaled and the material precipitated by addition of an excess 20 percent aqueous sodium hydroxide solution. 2,4-diamino-5-(2',4',5'-trimethoxybenzyl)pyrimidine of melting point 213° was obtained.

Preparation of 2,4-diamino-5-(4',5'-dimethoxy-2'-methylbenzyl)pyrimidine. — Acetylbromothymine (62 g.=0.25 mole), 3,4-dimethoxytoluene (45 g.=0.3 mole), nitrobenzene (50 ml.) were heated under stirring to 70–80°. Mercuric chloride (35 g.=0.125 mole) was added. A reaction started under evolution of heat so that the temperature rose spontaneously to 105–110°. All material went into a clear solution under evolution of hydrogen bromide. The temperature was kept at 105–110° for 5 minutes and then the reaction mixture was allowed to cool. The mercuric complex of the product was decomposed by stirring with a solution of 60 g. of sodium iodide in 300 ml. of 3 N aqueous sodium hydroxide solution and the nitrobenzene removed by ether extraction. The product was precipitated crystalline by the addition of 60 ml. of acetic acid to the aqueous layer. It was filtered by suction, washed with dilute sodium iodide solution and purified by dissolving it in 400 ml. of water and 70 ml. of 3 N aqueous sodium hydroxide solution in the heat, clearing the solution by filtration and reprecipitation with 30 ml. of acetic acid. The yield of 39 g. of 5-(4-,5-dimethxy-2-methylbenzyl)uracil corresponded to 57 percent of the theory. The melting point was 283–284°.

5-(4,5-dimethoxy-2-methylbenzyl)uracil (33 g.=0.115 mole), phosphorus oxychloride (130 ml.), dimethylaniline (2 ml.) were refluxed under stirring for 3 hours. The excess phosphorus oxychloride was distilled off in a vacuum and the syrupy residue slurried with ice water. The product crystallized and was collected by filtration. It was washed on the filter with water and then with a little ice cold alcohol. Recrystallized from ethanol, the product, 2,4-dichloro - 5-(4′,5′-dimethoxy-2′-methylbenzyl)pyrimidine, melted at 110°. The yield of 29 g. corresponded to 79 percent of the theory.

2,4-dichloro-5-(4′,5′-dimethoxy-2′-methylbenzyl)pyrimidine (29 g.=0.092 mole) was autoclaved with methanolic ammonia (300 ml. saturated at 0°) at 150–160° for 6 hours. After allowing to cool, the bulk of the product (17 g.) had crystallized and was filtered by suction. A second crop (5 g.) was obtained by evaporation of the mother liquor. The yield of 22 g. corresponded to 86.5 percent of the theory. The melting point was 233°.

To purify the product, 2,4-diamino-5-(4′,5′-dimethoxy-2′-methylbenzyl)pyrimidine, it was dissolved in 150 ml. of hot 20 percent acetic acid, the solution charcoaled and the product precipitated by the addition of an excess 25 percent aqueous sodium hydroxide solution to give white crystals of melting point 230°.

Preparation of 2,4-diamino-5(2′-ethyl-4′,5′-dimethoxybenzyl)pyrimidine.—4-ethylveratrole-(1-ethyl-3,4-dimethoxybenzene), 20 g.=0.12 mole, acetylbromothymine, 30 g.=0.12 mole, nitrobenzene, 50 ml. and mercuric chloride, 16.5 g.=0.6 mole were heated on a steam bath under exclusion of moisture to 90–100° until the reaction had subsided (15 to 20 minutes). The resulting solution was poured into a solution of sodium iodide, 40 g., in aqueous sodium hydroxide, 300 ml. 3 normal, and the nitrobenzene shaken out repeatedly with benzent. The aqueous layer gave upon neutralization with acetic acid 25 g. (75.5 percent) of 5-(2-ethyl-4,5-dimethoxybenzyl)uracil of melting point 219–220°.

5-(2-ethyl-4,5-dimethoxybenzyl)uracil, 21 g.=0.076 mole, phosphorus oxychloride, 84 ml. and dimethylaniline, 1.5 ml. were refluxed under stirring for hours. Excess phosphorus oxychloride was removed by vacuum distillation from a hot water bath and the syrupy residue decomposed with ice water. 2,4-dichloro-5-(2′-ethyl-4′,5′-dimethoxybenzyl)pyrimidine was extracted with ethylacetate and remained as a crystalline residue upon evaporation of the solvent. 20 g. (81 percent) of recrystallized (methanol) material were obtained of melting point 71–72°.

2,4 - dichloro-5-(2′-ethyl-4′,5′-dimethoxybenzyl)pyrimidine, 20 g. and methanolic ammonia, 300 ml. saturated at 0°, were autoclaved at 140–160° for 6 hours. After allowing to cool, 2,4-diamino-5-(2′-ethyl-4′,5′-dimethoxybenzyl)pyrimidine crystallized in part. The remainder was obtained by evaporation of the mother liquors. Recrystallized from 60 percent ethanol the product, 2,4-diamino-5-(2′-ethyl-4′,5′-dimethoxybenzyl)pyrimidine, was obtained in colorless crystals melting at 206–207°.

We claim:
1. A composition of combatting coccidiosis in poultry comprising a mixture of (a) a sulfa compound selected from the group consisting of sulfadimethoxine, sulfaquinoxaline, and sulfamethoxazole and (b) from about 0.01 part to about 20 parts by weight of a compound selected from the group consisting of a 2,4-diamino-5-(2′,4′,5′-trisubstitutedbenzyl)pyrimidine of the formula

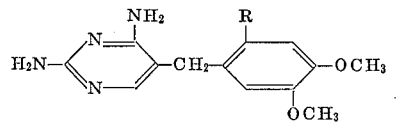
(I)

wherein R is selected from the group consisting of methoxy, methyl, and ethyl, per part by weight of sulfa compound,
and an acid addition salt of a compound of Formula I with a pharmaceutically acceptable acid.

2. A composition according to claim 1 wherein from about 0.1 to about 2.5 parts by weight (b) is present per part by weight of (a).

3. A composition according to claim 1 wherein the compound of Formula I is 2,4-diamino-5-(2′,4′,5′-trimethoxybenzyl)pyrimidine.

4. A composition according to claim 1 wherein the compound of Formula I is 2,4-diamino-5-(2′-methyl-4′,5′-dimethoxybenzyl)pyrimidine.

5. A composition according to claim 1 wherein the compound of Formula I is 2,4-diamino-5-(2′-ethyl-4′,5′-dimethoxybenzyl)pyrimidine.

6. A comestible for ad libitum feeding to poultry comprising a poultry comestible containing from about 0.001 to 0.1 percent by weight of a compound selected from the group consisting of 2,4-diamino-5-(2′,4′,5′-trisubstitutedbenzyl)pyrimidine of the formula

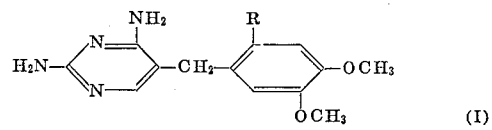
(I)

wherein R is selected from the group consisting of methoxy, methyl, and ethyl
and an acid addition salt of a compound of Formula I with a pharmaceutically acceptable acid, and from about 0.005 to about 0.1 percent of a sulfa compound selected from the group consisting of sulfadimethoxine, sulfaquinoxaline, and sulfamethoxazole.

7. A composition according to claim 6 wherein from about 0.005 to about 0.025 part by weight of said compound of Formula I and from about 0.01 to about 0.05 part by weight of sulfa compound are employed.

8. A process for treating coccidial infections in poultry comprising orally administering to the infected poultry an anticoccidial amount of a composition comprising (a) from about 0.01 to about 20 parts by weight of a compound selected from the group consisting of a 2,4-diamino-5-(2′,4′,5′-trisubstitutedbenzyl)pyrimidine of the formula

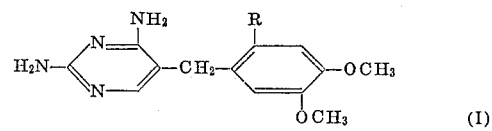
(I)

wherein R is selected from the group consisting of methoxy, methyl and ethyl
and an acid addition salt of a compound of Formula I with a pharmaceutically acceptable acid, and (b) one part by weight of a compound selected from the group consisting of sulfadimethoxine, sulfaquinoxaline, and sulfamethoxazole.

9. A process for preventing coccidiosis in poultry comprising treating poultry orally with an anticoccidial amount of a poultry comestible containing from about 0.001 to about 0.05 percent of a compound selected from the group consisting of a 2,4-diamino-1-(2′,4′,5′-trisubstitutedbenzyl)pyrimidine of the formula

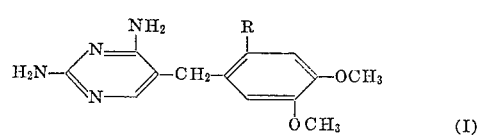
(I)

wherein R is selected from the group consisting of methoxy, methyl, and ethyl
and an acid addition salt of a compound of Formula I with a pharmaceutically acceptable acid, and from about 0.005 to about 0.05 part by weight of a compound selected from the group consisting of suladimethoxine, sulfaquinoxaline, and sulfamethoxazole.

10. A process for treating coccidiosis in infected poultry comprising treating infected poultry orally with an anticoccidial amount of a poultry comestble composition comprising from about 0.001 to about 0.1 part by weight of a compound selected from the group consisting of a 2,4-diamino-5-(2',4',5'-trisubstitutedbenzyl)pyrimidine of the formula

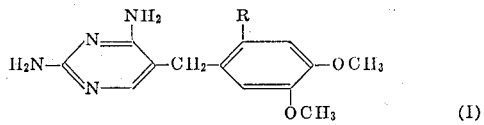

(I)

wherein R is selected from the group consisting of methoxy, methyl and ethyl
and an acid addition salt of a compound of Formula I with a pharmaceutically acceptable acid, and from about 0.005 to about 0.1 part by weight of a compound selected from the group consisting of sulfadimethoxine, sulfaquinoxaline, and sulfamethoxazole.

11. A composition comprising sulfaquinoxaline and from about 0.01 to about 20 parts by weight of 2,4-diamino-5-(2',4',5'-trimethoxybenzyl)pyrimidine per part by weight of sulfaquinoxaline.

12. A composition comprising sulfadimethoxine and from about 0.01 to about 20 parts by wtight of 2,4-diamino-5-(2',4',5'-trimethoxybenzyl)pyrimidine per part by weight of sulfadimethoxine.

13. A composition comprising sulfamethoxazole and from about 0.01 to about 20 parts by weight of 2,4-diamino-5-(2',4',5'-trimethoxybenzyl)pyrimidine per part by weight of sulfamethoxazole.

14. A composition comprising sulfaquinoxaline and from about 0.01 to about 20 parts by weight of 2,4-diamino-5-(2'-methyl-4',5'-dimethoxybenzyl)pyrimidine per part by weight of sulfaquinoxaline.

15. A composition comprising sulfadimethoxine and from about 0.01 to about 20 parts by weight of 2,4-diamino-5-(2'-methyl-4',5'-dimethoxybenzyl)pyrimidine per part by weight of sulfadimethoxine.

16. A composition comprising sulfamethoxazole and from about 0.01 to about 20 parts by weight of 2,4-diamino-5-(2'-methyl-4',5'-dimethoxybenzyl)pyrimidine per part by weight of sulfamethoxazole.

17. A composition comprising sulfaquinoxaline and from about 0.01 to about 20 parts by weight of 2,4-diamino-5-(2'-ethyl-4',5'-dimethoxybenzyl)pyrimidine per part by weight of sulfaquinoxaline.

18. A composition comprising sulfadimethoxine and from about 0.01 to about 20 parts by weight of 2,4-diamino-5-(2'-ethyl-4',5'-dimethoxybenzyl)pyrimidine per part by weight of sulfamethoxine.

19. A composition comprising sulfamethoxazole and from about 0.01 to about 20 parts by weight of 2,4-diamino-5-(2'-ethyl4',5'-dimethoxybenzyl)pyrimidine per part by weight of sulfamethoxazole.

20. A premix composition comprising a non-toxic diluent cntaining (a) from about 1.25 percent to about 25 percent of a compound selected from the group consisting of sulfadimethoxine, sulfaquinoxaline and sulfamethoxazole and (b) from about 0.25 percent to about 25 percent of a compound selected from the group consisting of a 2,4-diamino-5-(2',4',5'-trisubstitutedbenzyl)pyrimidine of the formula

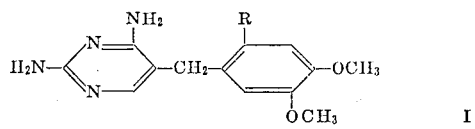

I wherein R is selected from the group consisting of methoxy, methyl and ethyl
and an acid addition salt of a compound of Formula I with a pharmaceutically acceptable acid.

References Cited
UNITED STATES PATENTS

| | | | |
|---|---|---|---|
| 3,341,541 | 9/1967 | Hoffer | 260—256.4 |
| 2,658,897 | 11/1953 | Hitchings et al. | 260—256.5 |
| 2,909,522 | 10/1959 | Hitchings et al. | 260—256.4 |
| 2,823,160 | 2/1958 | Lux et al. | 167—53.1 |
| 2,783,178 | 2/1957 | White | 167—53.1 |
| 2,628,236 | 2/1953 | Hitchings et al. | 260—256.4 |
| 3,085,937 | 4/1963 | Hirayama et al. | 167—53.1 |
| 3,049,544 | 8/1962 | Steinbuck | 260—256.4 |

FOREIGN PATENTS 957,797    5/1964    Great Britain.

OTHER REFERENCES

Biological Council, Drugs, Parasites and Hosts, London, 1962, p. 207.

FRANK CACCIAPAGLIA, Jr., Primary Examiner

U.S. Cl. X.R.

424—251

PO-1050 (5/69)

UNITED STATES PATENT OFFICE
CERTIFICATE OF CORRECTION

Patent No. 3,461,206      Dated August 12, 1969

Inventor(s) Hoffer and Mitrovic

It is certified that error appears in the above-identified patent and that said Letters Patent are hereby corrected as shown below:

Column 6, line 7 of Claim 2
"by weight (b)" should be by weight of (b)

Column 6, line 21 - claim 6
"consisting of 2,4-" should be consisting of a 2,4-

Column 6, line 63 - claim 9
"2,4-diamino 1" should be 2,4-diamino 5

Column 7, line 1 - claim 9
"suladimethoxine" should be sulfadimethoxine

Column 7, line 4 - claim 10
"comestble" should be comestible

Column 7, line 28 - claim 12
"wtight" should be weight

Column 8, line 4 - claim 18
"sulfamethoxine" should be sulfadimethoxine

UNITED STATES PATENT OFFICE
CERTIFICATE OF CORRECTION

PO-1050 (5/69)

Patent No. 3,461,206     Dated August 12, 1969

Inventor(s) Hoffer and Mitrovic

It is certified that error appears in the above-identified patent and that said Letters Patent are hereby corrected as shown below:

Column 8, line 7 - claim 19
"2'ethyll 4'" should be

2'ethyl -4'

Column 8, line 10 - claim 20
"cntaining" should be containing

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents